United States Patent
Bowers et al.

(10) Patent No.: US 11,192,636 B2
(45) Date of Patent: Dec. 7, 2021

(54) AERODYNAMIC REDUNDANT ACTUATION SYSTEM FOR AIRCRAFT

(71) Applicant: THE BOEING COMPANY, Chicago, IL (US)

(72) Inventors: Bret Alan Bowers, Langley, WA (US); Scott Thomas Evoy, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 92 days.

(21) Appl. No.: 16/813,511

(22) Filed: Mar. 9, 2020

(65) Prior Publication Data

US 2021/0276694 A1    Sep. 9, 2021

(51) Int. Cl.
| | | |
|---|---|---|
| *B64C 13/00* | (2006.01) | |
| *B64C 13/28* | (2006.01) | |
| *B64C 9/00* | (2006.01) | |
| *B64C 13/50* | (2006.01) | |
| *B64C 9/20* | (2006.01) | |
| *B64C 13/42* | (2006.01) | |
| *B64C 9/04* | (2006.01) | |

(52) U.S. Cl.
CPC ............. *B64C 13/341* (2018.01); *B64C 9/04* (2013.01); *B64C 9/20* (2013.01); *B64C 13/42* (2013.01); *B64C 13/505* (2018.01); *B64C 2009/005* (2013.01)

(58) Field of Classification Search
CPC ...... B64C 13/341; B64C 13/42; B64C 13/505
See application file for complete search history.

(56) References Cited

U.S. PATENT DOCUMENTS 5,701,801 A * 12/1997 Boehringer ............. F15B 20/00
                                                           92/166
9,663,221 B2 * 5/2017 Ishihara .................... B64C 9/02

* cited by examiner

*Primary Examiner* — Richard G Davis
(74) *Attorney, Agent, or Firm* — Moore Intellectual Property Law, PLLC (57) ABSTRACT

An actuation system for a control surface of an aircraft includes a drive lever. The drive lever includes a coupling end configured to pivotably couple to a plurality of wing attach fittings and a lever end. The lever end includes a first actuator fitting configured to pivotably couple to a first actuator on a forward side of the drive lever; a second actuator fitting configured to pivotably couple to a second actuator on an aft side of the drive lever; a first drive link fitting configured to couple, via a first drive link, to a control surface of an aircraft; and a second drive link fitting configured to couple, via a second drive link, to the control surface of the aircraft.

21 Claims, 10 Drawing Sheets

AERODYNAMIC REDUNDANT ACTUATION SYSTEM FOR AIRCRAFT

FIELD OF THE DISCLOSURE

The present disclosure is generally related to actuations systems for aircraft.

BACKGROUND

Modern aircraft often include redundant systems to improve operational reliability. As an example, redundancy of actuation is often provided for control surfaces of the aircraft. Such redundant actuation mechanisms can be bulky and can reduce aircraft performance or efficiency if the bulk associated with the redundant actuation mechanism interferes with the aerodynamics of the aircraft. For example, high speed aircraft or high efficiency aircraft may have thin wings to decrease drag. The actuation mechanisms are often too bulky to fit within a wing box of a thin wing, in which case a fairing is used to cover the actuation mechanism to reduce the drag associated with the actuation mechanism. In this example, if the aircraft includes both a primary actuation mechanism and a redundant actuation mechanism, either multiple fairing are used (e.g., one per actuation mechanism), or a single large faring is used to cover both actuation mechanisms. Using multiple fairings or a single larger fairing significantly increases drag on the aircraft.

SUMMARY

According to a particular aspect, an actuation system for a control surface of an aircraft includes a drive lever. The drive lever includes a coupling end configured to pivotably couple to a plurality of wing attach fittings and a lever end. The lever end includes a first actuator fitting configured to pivotably couple to a first actuator on a forward side of the drive lever; a second actuator fitting configured to pivotably couple to a second actuator on an aft side of the drive lever; a first drive link fitting configured to couple, via a first drive link, to a control surface of an aircraft; and a second drive link fitting configured to couple, via a second drive link, to the control surface of the aircraft.

According to another particular aspect, an aircraft includes a control surface pivotably coupled to a static aerodynamic structure and an actuation system of the control surface. The actuation system includes a plurality of fittings attached to the static aerodynamic structure and a drive lever pivotably coupled, at a coupling end, to the plurality of fittings and pivotably coupled, at a lever end, to a first actuator, to a second actuator, to a first drive link, and to a second drive link. The first actuator is coupled to the static aerodynamic structure forward of the drive lever, and the second actuator is coupled to the static aerodynamic structure aft of the drive lever. The first drive link and the second drive link are coupled to the control surface.

According to another particular aspect, a method includes rotating a control surface in a first direction relative to a wing of an aircraft by applying, using a first actuator, a first force to a drive lever that is pivotably coupled, at a coupling end, to the wing and pivotably coupled, at a lever end, to the first actuator, to a second actuator, to a first drive link, and to a second drive link, where one or both of the first drive link and second drive link cause the control surface to rotate responsive to application of the first force to the drive lever. The method also includes, at a different time, rotating the control surface in the first direction relative to the wing of the aircraft by applying, using the second actuator, a second force to the drive lever, where one or both of the first drive link and second drive link cause the control surface to rotate responsive to application of the second force.

The features, functions, and advantages described herein can be achieved independently in various implementations or may be combined in yet other implementations, further details of which can be found with reference to the following description and drawings.

DETAILED DESCRIPTION

An actuation system that provides redundancy and that is both light weight and compact is disclosed. Primary and redundant components of the actuation system are arranged to be covered by a single fairing with an aerodynamic cross section approximately equal to the aerodynamic cross section of a fairing configured to cover only the primary components. To illustrate, the primary and redundant components of the actuation system are substantially aligned along a forward-aft axis of the aircraft.

The actuation system includes two or more separate actuators attached to a wing (or another static aerodynamic structure of the aircraft, such as a horizontal stabilizer or vertical stabilizer). Each of the actuators is attached to the wing or other structure using its own attachment fitting and each is individually capable of driving a control surface. The actuators are each attached (via separate connections) to a drive lever, and the drive lever is attached via multiple distinct attachment fittings to the wing or other structure. Multiple drive links are attached (via separate connections) to the drive lever, and the drive links are coupled to the control surface via separate attachment fittings. Each drive link is individually capable of driving the control surface.

The actuators and the drive lever are arranged more or less in line with one another along the forward-aft axis of the aircraft enabling the entire system to be covered by a single fairing with a relatively small aerodynamic cross section. Thus, the disclosed actuation system provides actuation redundancy for a control surface without significantly increasing drag.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2A, multiple actuators are illustrated and associated with reference numbers 110A and 110B. When referring to a particular one of these designs, such as the second actuator 110A, the distinguishing letter "A" is used. However, when referring to any arbitrary one of these designs or to these designs as a group, the reference number 110 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and may subsequently be referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1A:
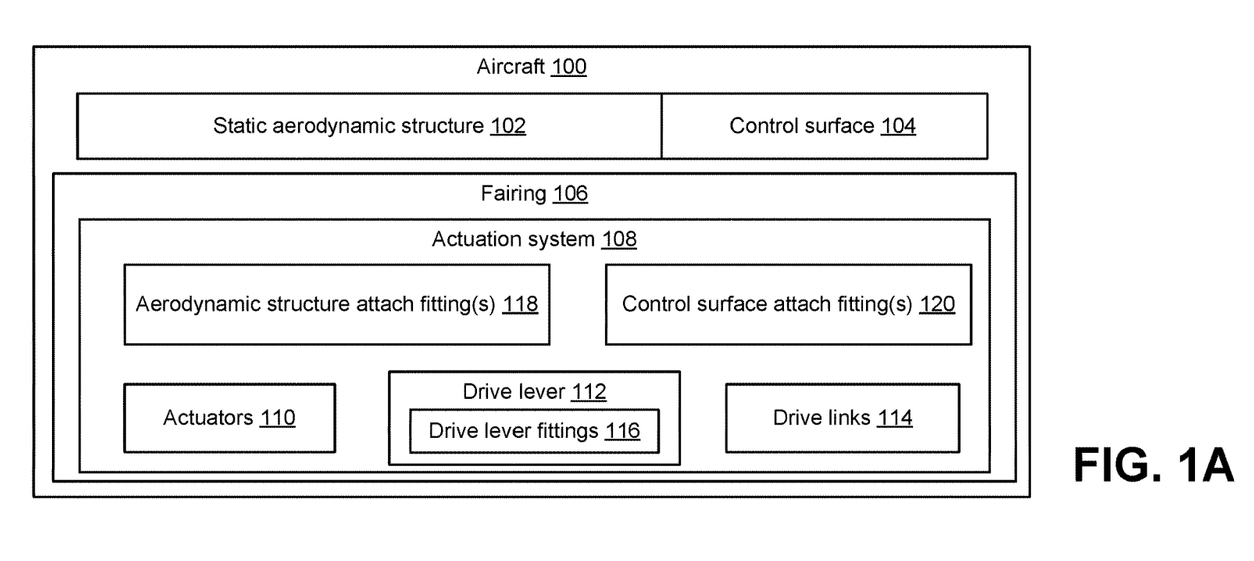
FIG. 1A is a block diagram that illustrates an aircraft including an actuation system according to a particular implementation.
Figure 1B:
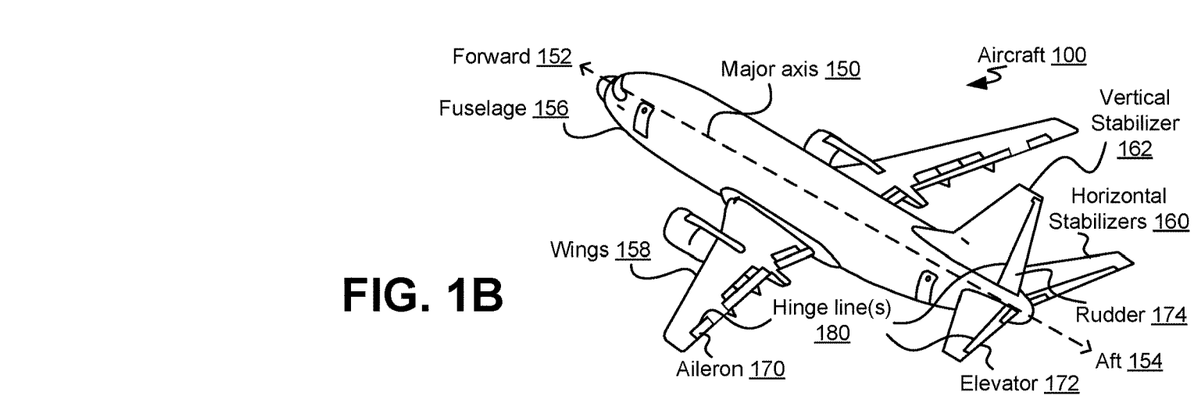
FIG. 1B is a diagram of a particular implementation of the aircraft of FIG. 1A.

FIG. 1A is a block diagram that illustrates an aircraft 100 including an actuation system 108 according to a particular implementation. FIG. 1B is a diagram of a particular implementation of the aircraft 100 illustrating particular physical arrangements of the aircraft 100 of FIG. 1A.

In FIG. 1A, the aircraft 100 includes one or more static aerodynamic structures 102 associated with (e.g., coupled to) one or more control surfaces 104, and FIG. 1B illustrates several, non-limiting examples of static aerodynamic structures 102, control surfaces 104, and hinge lines 180 therebetween. To illustrate, wings 158 and ailerons 170 of the aircraft 100 of FIG. 1B correspond to the static aerodynamic structures 102 and control surfaces 104, respectively, of FIG. 1A in some implementations. As another illustrative example, horizontal stabilizers 160 and elevators 172 of the aircraft 100 of FIG. 1B correspond to the static aerodynamic structures 102 and control surfaces 104, respectively, of FIG. 1A in some implementations. As yet another illustrative example, vertical stabilizers 162 and a rudder 174 of the aircraft 100 of FIG. 1B correspond to the static aerodynamic structures 102 and control surfaces 104, respectively, of FIG. 1A in some implementations. FIG. 1B also illustrates a major axis 150 of the aircraft 100, which extends along a fuselage 156 and which defines forward 152 and aft 154 directions.

As illustrated in FIG. 1A, the aircraft 100 includes the actuation system 108, which in some implementations, is enclosed within or covered by a fairing 106 (e.g., a single fairing covering all of the components of the actuation system 108). The actuation system 108 includes a drive lever 112 coupled to the static aerodynamic structure 102 via one or more aerodynamic structure attach fittings 118. The drive lever 112 includes a plurality of drive lever fittings 116 to couple the drive lever 112 to multiple actuators 110 and multiple drive links 114. The actuators 110 are coupled, via the one or more aerodynamic structure attach fittings 118, to the static aerodynamic structures 102. The drive links 114 are coupled to the control surface 104 via one or more control surface attach fittings 120. The actuation system 108 is configured to enable either of the actuators 110 to drive the control surface 104 independently of the other actuator 110. Further, the actuation system 108 is configured such that either of the drive links 114 can drive the control surface 104 independently of the other drive link 114. Additionally, the actuation system 108 is configured to enable control of the control surface 104 in the event of failure of any one (or potentially even several) of the aerodynamic structure attach fittings 118 or the control surface attach fittings 120. Thus, the actuation system 108 provides redundant control of the control surface 104 in the event that one or more components of the actuation system 108 experience fault.

Additionally, the actuation system 108 is light weight and aerodynamically efficient. For example, a first of the actuators 110 is coupled to the static aerodynamic structure 102 on a forward 152 side of the drive lever 112, and a second of the actuators 110 is coupled to the static aerodynamic structure 102 on an aft 154 side of the drive lever 112, so that the aerodynamic cross-section of the actuation system 108 is approximately the same as the aerodynamic cross-section of the drive link 114. In this arrangement, the aerodynamic cross-section of the actuation system 108 is approximately the same with two actuators 110 as it would be with one actuator 110.

Although FIG. 1A illustrates only one actuation system 108 onboard the aircraft 100, in some implementations, the aircraft 100 includes multiple actuation systems 108. For example, each of the wings 158 can include one or more actuation systems 108 coupled to a respective control surface 104 (e.g., an aileron 170); each of the horizontal stabilizers 160 can include one or more actuation systems 108 coupled to a respective control surface (e.g., an elevator 172); the vertical stabilizer 162 can include one or more actuation systems 108 coupled to a control surface (e.g., the rudder 174); or a combination thereof.

Figure 2A:
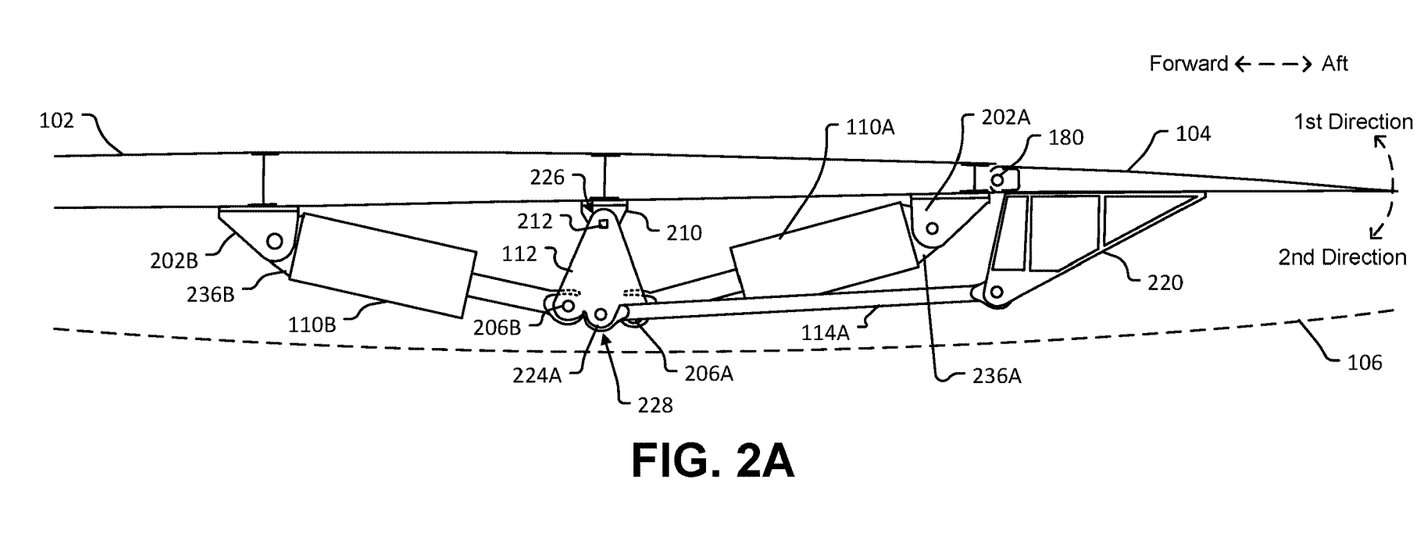
FIG. 2A is a diagram of a side view of a particular implementation of the actuation system of FIG. 1A.
Figure 2B:
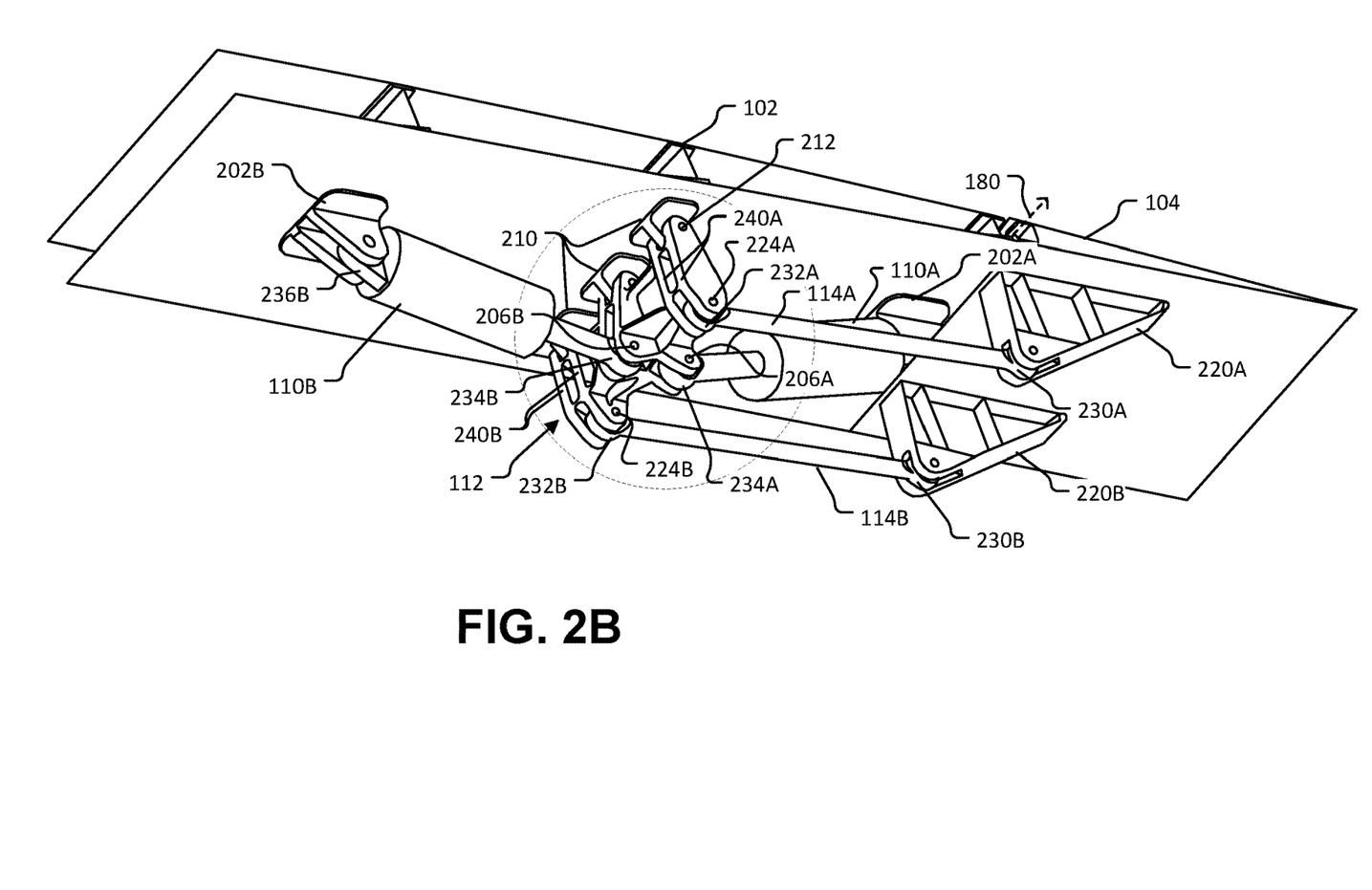
FIG. 2B is a diagram of a perspective view of the actuation system of FIG. 2A.

FIGS. 2A and 2B are diagrams illustrating a side view and a perspective view, respectively, of the actuation system 108 according to a particular implementation. In the following description, for ease of reference, certain components are referenced as though the static aerodynamic structure 102 were a wing. For example, the drive lever 112 is described as attached to the static aerodynamic structure 102 via a plurality of wing attach fittings 210. This terminology is selected merely for brevity of description (e.g., to avoid repeated reference to "static aerodynamic structure attach fittings") since the attach fittings used to attached the drive lever 112 to a wing can equally well be used to attach the drive lever 112 to a horizontal stabilizer, a vertical stabilizer, or another static aerodynamic structure.

The drive lever 112 has a coupling end 226 to pivotably couple the drive lever 112 to the plurality of wing attach fittings 210. The drive lever 112 also has a lever end 228 that includes a plurality of fittings to couple to the actuators 110 and the drive links 114. For example, the lever end 228 of the drive lever 112 includes a first actuator fitting 206B to pivotably couple the drive lever 112 to a first end 234B of first actuator 110B (on a forward side of the drive lever 112) and a second actuator fitting 206A to pivotably couple the drive lever 112 to a first end 234A of a second actuator 110A (on an aft side of the drive lever 112). A second end 236B of the first actuator 110B is coupled to the static aerodynamic structure 102 via a first actuator wing attach fitting 202B, and a second end 236A of the second actuator 110A is coupled to the static aerodynamic structure 102 via a second actuator wing attach fitting 202A. Both of the actuator wing attach fittings 202 are disposed forward of the hinge line 180 between the static aerodynamic structure 102 and the control surface 104.

The lever end 228 of the drive lever 112 also includes a first drive link fitting 224B to couple to a first drive link 114B and includes a second drive link fitting 224A to couple to a second drive link 114A. The drive links 114 are coupled to the control surface 104. For example, as illustrated in FIG. 2B, a first end 230B of the first drive link 114B is coupled to a first control surface attach fitting 220B and a second end 232B of the first drive link 114B is coupled to a first drive link fitting 224B of the drive lever 112. Additionally, a first end 230A of the second drive link 114A is coupled to a second control surface attach fitting 220A and a second end 232A of the second drive link 114A is coupled to a second drive link fitting 224A of the drive lever 112.

In the arrangement illustrated in FIGS. 2A and 2B, either of the drive links 114 can apply force to the control surface 104 to move the control surface 104 in either of the first and second directions. Additionally, the drive lever 112 can drive either (or both) of the drive links 114 responsive to force applied by either (or both) of the actuators 110. To illustrate, if the first actuator 110B extends, the drive lever 112 is rotated such that the lever end 228 moves in the aft direction and one or both of the drive links 114 drive the control surface 104 in the first direction illustrated in FIG. 2A. Likewise, if the second actuator 110A retracts, the drive lever 112 is rotated such that the lever end 228 moves in the aft direction and one or both of the drive links 114 drive the control surface 104 in the first direction. Conversely, if the first actuator 110B retracts (or if the second actuator 110A extends), the drive lever 112 is rotated such that the lever end 228 moves in the forward direction and one or both of the drive links 114 drive the control surface 104 in the second direction illustrated in FIG. 2A.

Figure 2C:
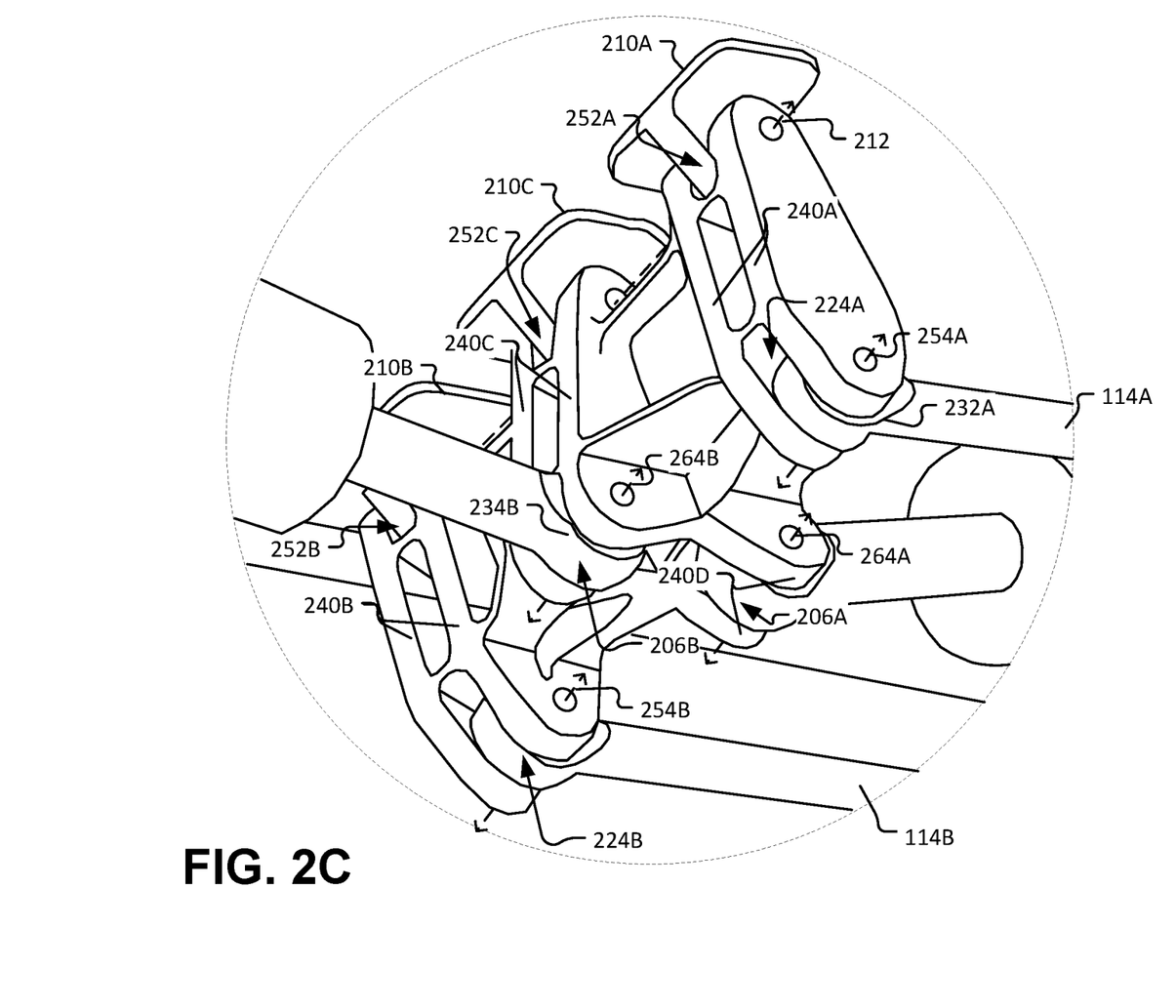
FIG. 2C is a diagram illustrating details of a drive lever of an actuation system according to a particular implementation.

FIG. 2C is a diagram illustrating details of the drive lever 112 of the actuation system 108 according to a particular implementation. In FIG. 2C, a body of the drive lever 112 is a unitary member including a plurality of stiffeners 240 extending between the lever end 228 and the coupling end 226. In the implementation illustrated in FIG. 2C, the drive lever 112 includes a first pair of stiffeners 240B, a second pair of stiffeners 240A, a third pair of stiffeners 240C, and a fourth pair of stiffeners 240D on the opposite side of the body of the drive lever 112 from the third pair of stiffeners 240C.

In a particular implementation, pairs of stiffeners 240 define fittings on the coupling end 226 and fittings on the lever end 228. To illustrate, the first pair of stiffeners 240B defines a first wing pivot fitting 252B at the coupling end 226 to couple the drive lever 112 to a first wing attach fitting 210B and defines the first drive link fitting 224B at the lever end 228 to couple to the first drive link 114B. Additionally, the second pair of stiffeners 240A defines a second wing pivot fitting 252A at the coupling end 226 to couple the drive lever 112 to a second wing attach fitting 210A and defines the second drive link fitting 224A at the lever end 228 to couple to the second drive link 114A. Further, the third pair of stiffeners 240C defines a third wing pivot fitting 252C at the coupling end 226 to couple the drive lever 112 to a third wing attach fitting 210C and defines the first actuator fitting 206B at the lever end 228 to couple to the first actuator 110B. In the implementation illustrated in FIG. 2C, the fourth pair of stiffeners 240D merges or joins with the third pair of stiffeners 240C at the coupling end 226 to form the third wing pivot fitting 252C and defines the second actuator fitting 206A at the lever end 228 to couple to the second actuator 110A. Further, although three wing attach fittings 210 are illustrated, in other implementation, the drive lever 112 includes fewer than three or more than three wing attach fittings 210.

Each fitting illustrated in FIG. 2C forms a pivotable connection. For example, when the first end 232A of the second drive link 114A is coupled to the second drive link fitting 224A, the joint is rotatable about a drive link pivot axis 254A. Similarly, the other intersections form by coupling the first drive link fitting 224B to the first drive link 114B, the second actuator fitting 206A to the second actuator 110A, and the first actuator fitting 206B to the first actuator 110B are pivotable about respective axes, including a drive link pivot axis 254B, an actuator pivot axis 264A, and an actuator pivot axis 264B. Additionally, the joints formed by coupling the drive lever 112 to the wing attach fittings 210 are pivotable about a wing pivot axis 212. The axes 212, 254A, 254B, 264A, and 264B are substantially (e.g., within manufacturing tolerances) parallel to one another.

The arrangement of components illustrated in FIGS. 2A and 2B is well suited for use in configurations in which the hinge line 180 between the control surface 104 and the static aerodynamic structure 102 is approximately parallel to the axes 212, 254A, 254B, 264A, and 264B. For example, the hinge line 180 may be approximately parallel to the axes 212, 254A, 254B, 264A, and 264B when the hinge line 180 and the axes 212, 254A, 254B, 264A, and 264B are approximately perpendicular to the major axis of the aircraft 100. In this example, the drive links 114 are the same length and the control surface attach fittings 220 are essentially identical, so that the displacement (e.g., in the first direction or the second direction indicated in FIG. 2A) of the control surface 104 is not dependent on which drive link 114 is driving the control surface 104.

If the hinge line 180 is non-perpendicular to the major axis 150 of the aircraft 100, the drive links 114, the drive lever 112, the control surface attach fittings 220, or a combination thereof can be modified to reduce differences in displacement of the control surface 104 depending on which drive link 114 is driving the control surface 104. For example, if the hinge line 180 is nearly perpendicular (e.g., within 10 to 15 degrees of perpendicular) to the major axis 150, the drive links 114 can be different lengths or other changes to the configuration illustrated in FIGS. 2A and 2B can be used to reduce the reduce differences in displacement of the control surface 104 depending on which drive link 114 is driving the control surface 104. Reducing the differences in displacement of the control surface 104 depending on which drive link 114 is driving the control surface 104 reduces the impact on aircraft control in the event of failure of one of the drive links.

FIGS. 3A-3D illustrate an example of the actuation system 108 that is suitable for use when the hinge line 180 is not perpendicular to the major axis 150 of the aircraft 100.

Figures 3A, 3B:
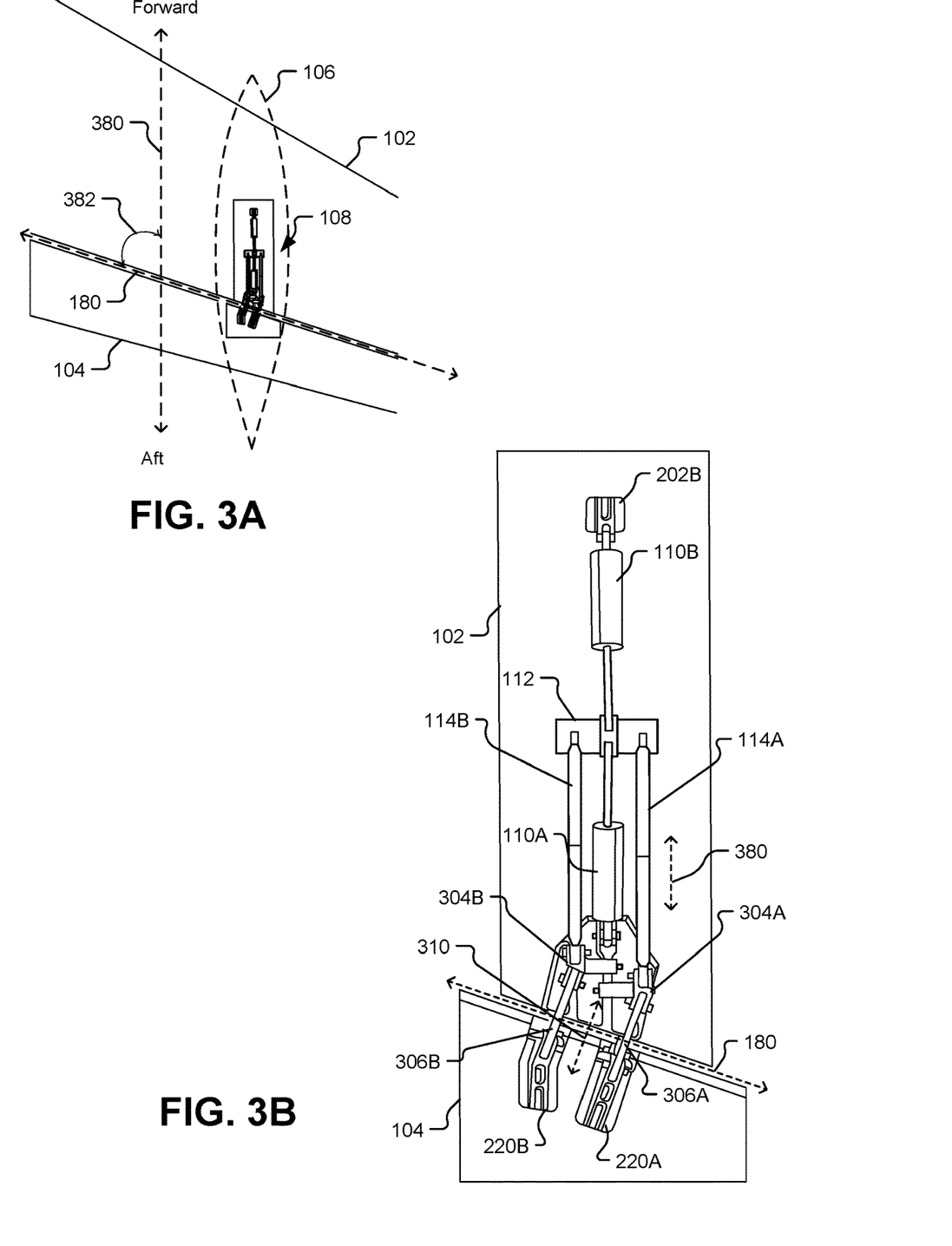
FIG. 3A is a diagram of a plan view of a particular implementation of the actuation system of FIG. 1A.
FIG. 3B is a diagram of a closer plan view of the actuation system of FIG. 3A.

FIG. 3A is a diagram of a plan view of a particular implementation of the actuation system of FIG. 1A. In FIG. 3A, an example of the hinge line 180 between the static aerodynamic structure 102 and the control surface 104 is shown in comparison to a line 380 that is parallel to the major axis 150 of the aircraft 100. As shown in FIG. 3A, an angle 382 between the hinge lines 180 and the line 380 is not a right angle (i.e., the hinge lines 180 is not perpendicular to the line 380 or to the major axis 150 of the aircraft 100).

Figure 3C:
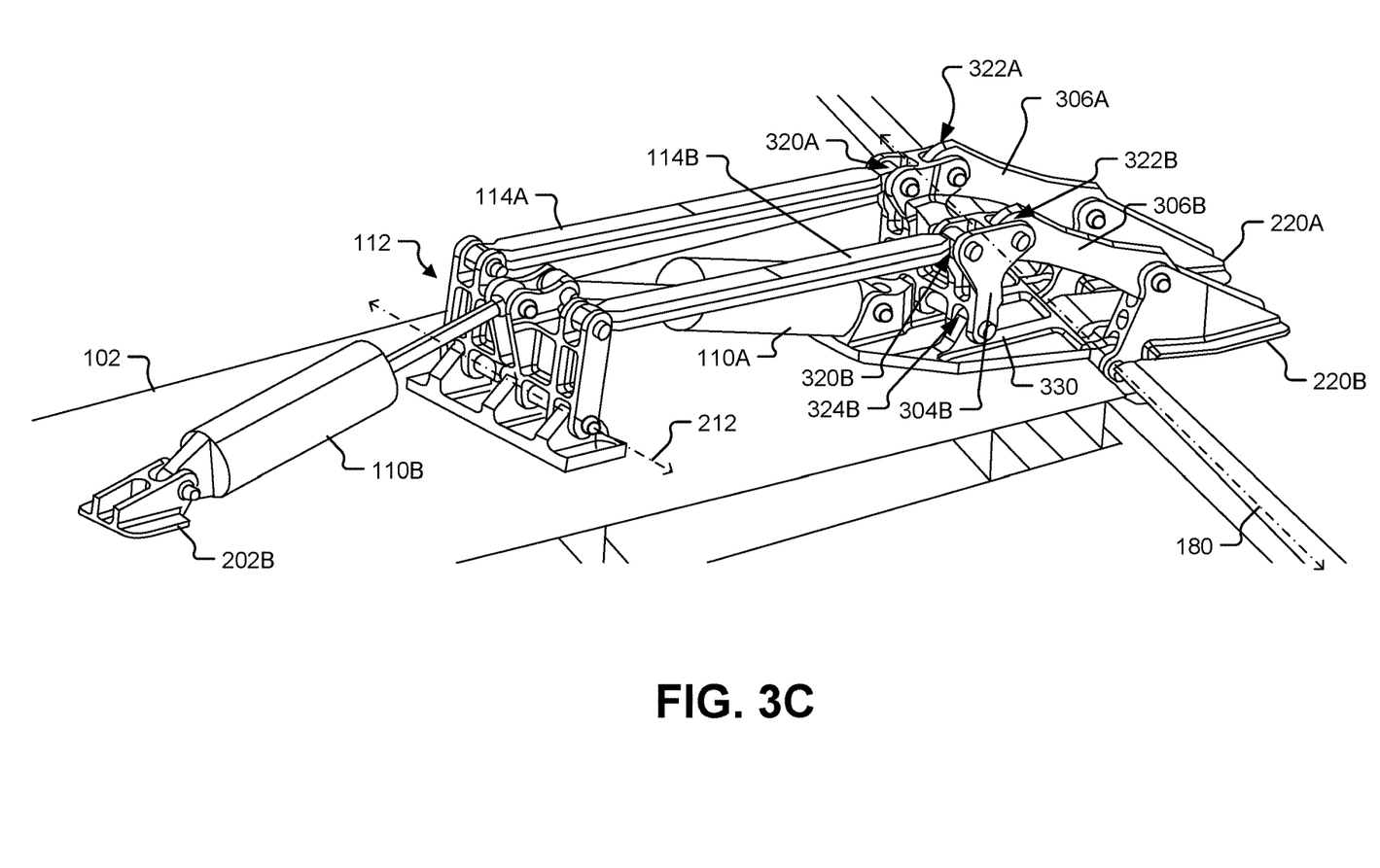
FIG. 3C is a diagram of a perspective view of the actuation system of FIG. 3A.

FIG. 3B shows a plan view of an implementation of the actuation system 108 arranged to accommodate the situation illustrated in FIG. 3A. FIG. 3C is a diagram of a perspective view of the actuation system 108 of FIG. 3B, and FIG. 3D is a diagram of a detailed view of a portion of the actuation system 108 of FIG. 3B.

The actuation system 108 of FIGS. 3B-3D includes the components discussed with reference to FIGS. 1, 2A, 2B, and 2C, and includes additional components to accommodate the angle 382 between the hinge line 180 and the major axis 150 of the aircraft 100. The additional components include a first kick lever 304B coupled to the first drive link 114B and to a first surface drive link 306B and a second kick lever 304A coupled to the second drive link 114A and to a second surface drive link 306A. The kick levers 304 are configured to convert motion in a direction along the line 380 to motion in a direction 310 that is substantially perpendicular to the hinge line 180.

Figure 3D:
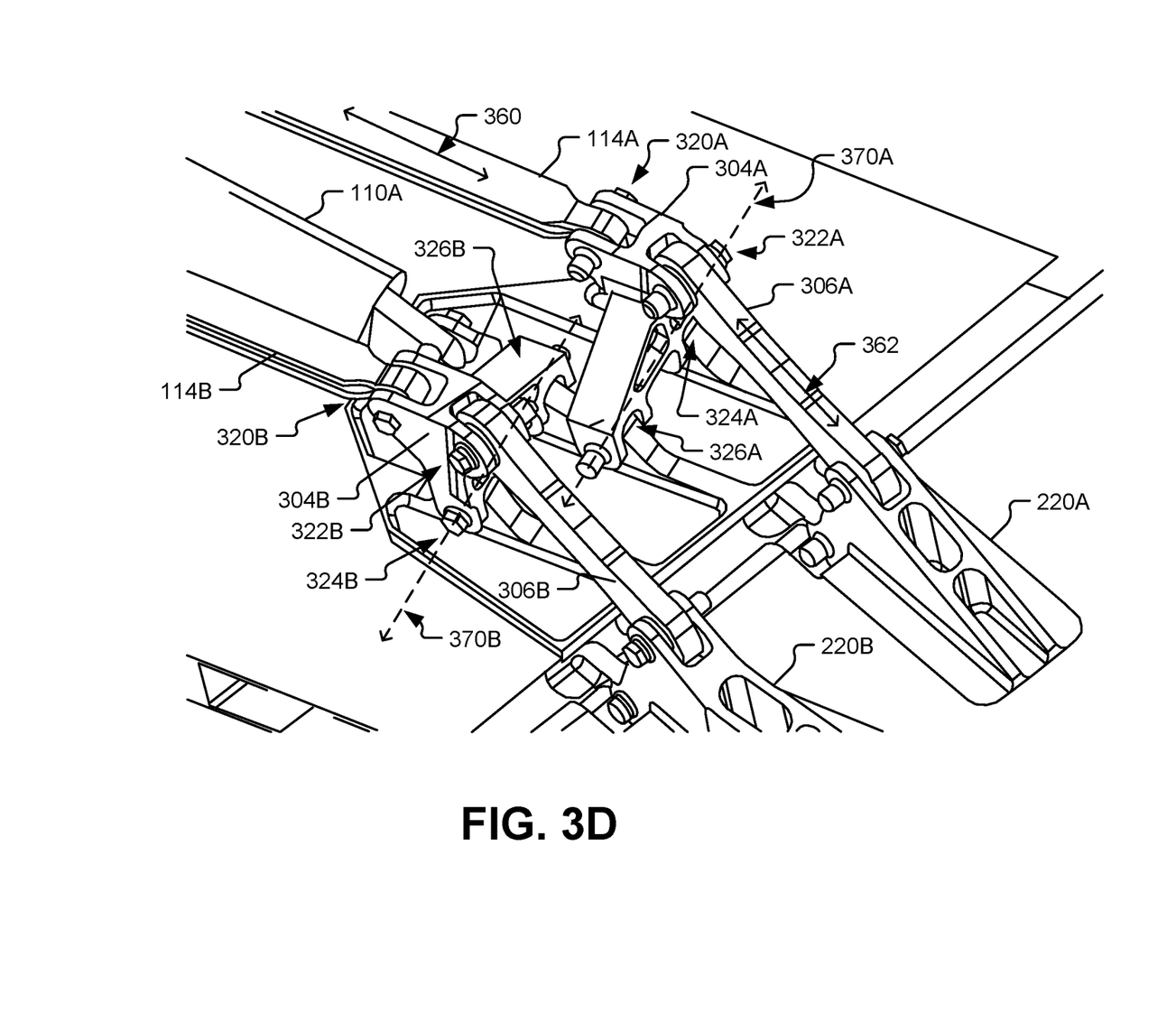
FIG. 3D is a diagram of a detailed view of a portion of the actuation system of FIG. 3A.

In the example illustrated in FIGS. 3C and 3D, each of the kick levers 304 defines multiple fittings, including a drive link fitting 320, a static aerodynamic structures attach fitting 324, a side load fitting 326, and a surface drive link fitting 322. For example, the first kick lever 304B includes a first drive link fitting 320B, a first static aerodynamic structure attach fitting 324B, a first side load fitting 326B, and a first surface drive link fitting 322B. Additionally, the second kick lever 304A includes a second drive link fitting 320A, a second static aerodynamic structure attach fitting 324A, a second side load fitting 326A, and a second surface drive link fitting 322A. The side load fittings 326 limit side-to-side motion of the kick levers 304 due to the angle between the direction of motion 360 of the drive links 114 and the direction of motion 362 of the surface drive links 306.

The static aerodynamic structure attach fittings 324 and side load fittings 326 are configured to pivotably couple the kick levers 304 to one or more fittings 330 coupled to the static aerodynamic structure 102. In the implementation illustrated in FIGS. 3C and 3D, the fitting(s) 330 are integral with or coupled to the second actuator wing attach fitting 202A; however, in other implementations, the fitting(s) 330 are distinct and not coupled to the second actuator wing attach fitting 202A. A static aerodynamic structure attach fitting 324 and a side load fitting 326 of one kick lever 304 are aligned to pivot along a common axis 370. To illustrate, the first kick lever 304B is coupled to the fitting(s) 330 to pivot with respect to the static aerodynamic structure 102 along axis 370A, and the second kick lever 304A is coupled to the fitting(s) 330 to pivot with respect to the static aerodynamic structure 102 along axis 370B. In the implementation illustrated in FIGS. 3A-3D, the axes 370 are parallel to one another and are not parallel to the axis 212.

The static aerodynamic structure attach fittings 324 and side load fittings 326 of the kick levers 304 are offset from one another. For example, in the implementations illustrated in FIG. 3A-3D, the static aerodynamic structure attach fitting 324B of the first kick lever 304B is coupled to the static aerodynamic structure 102 at a location that is forward of the location at which the static aerodynamic structure attach fitting 324A of the second kick lever 304A is coupled to the static aerodynamic structure 102. Additionally, in the implementations illustrated in FIG. 3A-3D, the side load fitting 326B of the first kick lever 304B is coupled to the static aerodynamic structure 102 at a location that is forward of the location at which the side load fitting 326A of the second kick lever 304A is coupled to the static aerodynamic structure 102. The locations at which the kick levers 304 attach to the static aerodynamic structure 102 and the geometry of each kick lever 304 are configured such that a length of the first surface drive link 306B is substantially (e.g., within manufacturing tolerances) equal to the length of the second surface drive link 306A and to allow the surface drive links 306 to be positioned substantially perpendicular to the hinge line 180. Substantially equal lengths of the surface drive links 306 reduces the differences in displacement of the control surface 104 depending on which surface drive link 306 is driving the control surface 104. The drive links 114, the surface drive links 306, the fitting(s) 320, 322, 324, 326, or a combination thereof, are coupled to the kick levers 304 using spherical bearings to allow some side-to-side movement at the fittings of the kick levers 304.

Figure 4:
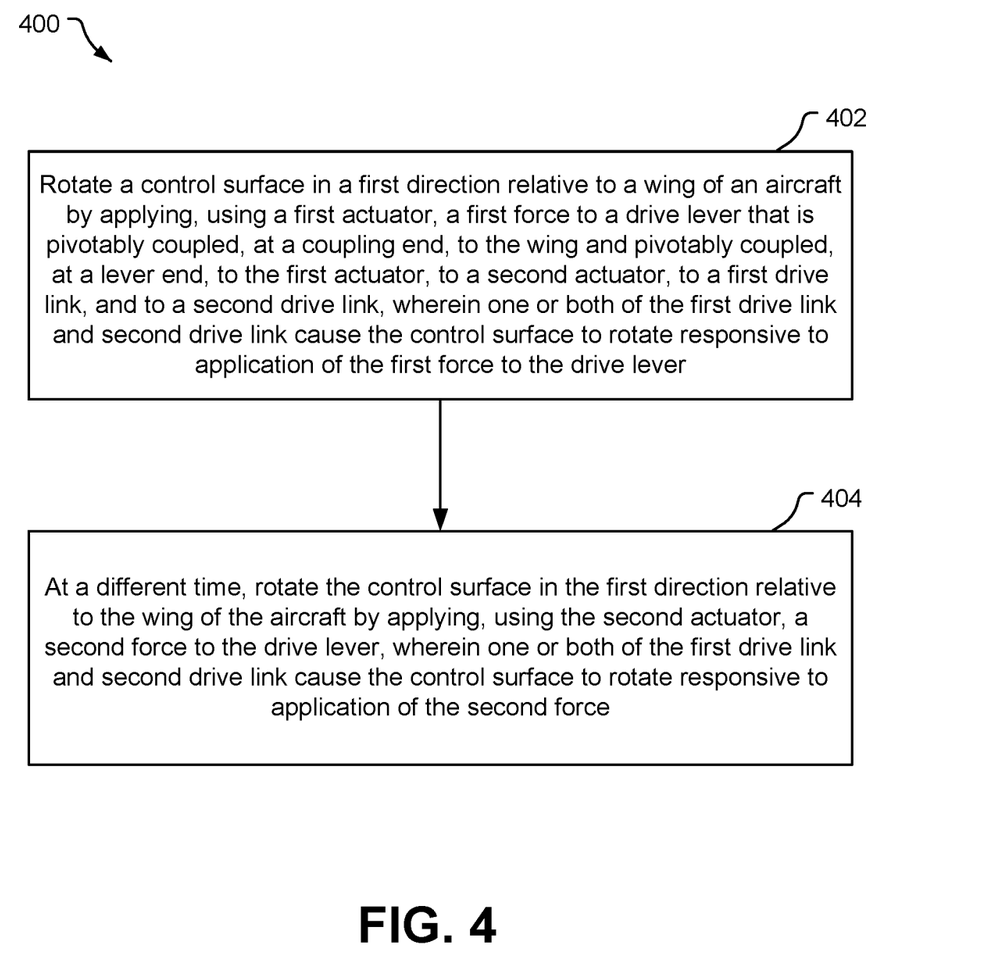
FIG. 4 is a flow chart of an example of method of operation of the actuation system of FIG. 1A.

FIG. 4 is a flow chart of an example of method 400 of operation of the actuation system 108 of FIG. 1A. The method 400 includes, at 402, rotating a control surface in a first direction relative to a wing of an aircraft by applying, using a first actuator, a first force to a drive lever that is pivotably coupled, at a coupling end, to the wing and pivotably coupled, at a lever end, to the first actuator, to a second actuator, to a first drive link, and to a second drive link, where one or both of the first drive link and second drive link cause the control surface to rotate responsive to application of the first force to the drive lever. The method 400 also includes, at 404, at a different time, rotating the control surface in the first direction relative to the wing of the aircraft by applying, using the second actuator, a second force to the drive lever, wherein one or both of the first drive link and second drive link cause the control surface to rotate responsive to application of the second force. For example, the control surface 104 of any of FIGS. 1A-3D can be rotated in a first direction (as illustrated in FIG. 2A) responsive to the first actuator 110B extending (e.g., along a forward/aft direction). Later, e.g., responsive to a fault condition associated with the first actuator 110B, the control surface 104 of any of FIGS. 1A-3D can be rotated in the first direction responsive to the second actuator 110A retracting (e.g., along the forward/aft direction). Regardless of which actuator 110 applies force to the drive lever 112, the drive lever 112 transfers the force to one or both of the drive links 114 to move the control surface 104.

Figure 5:
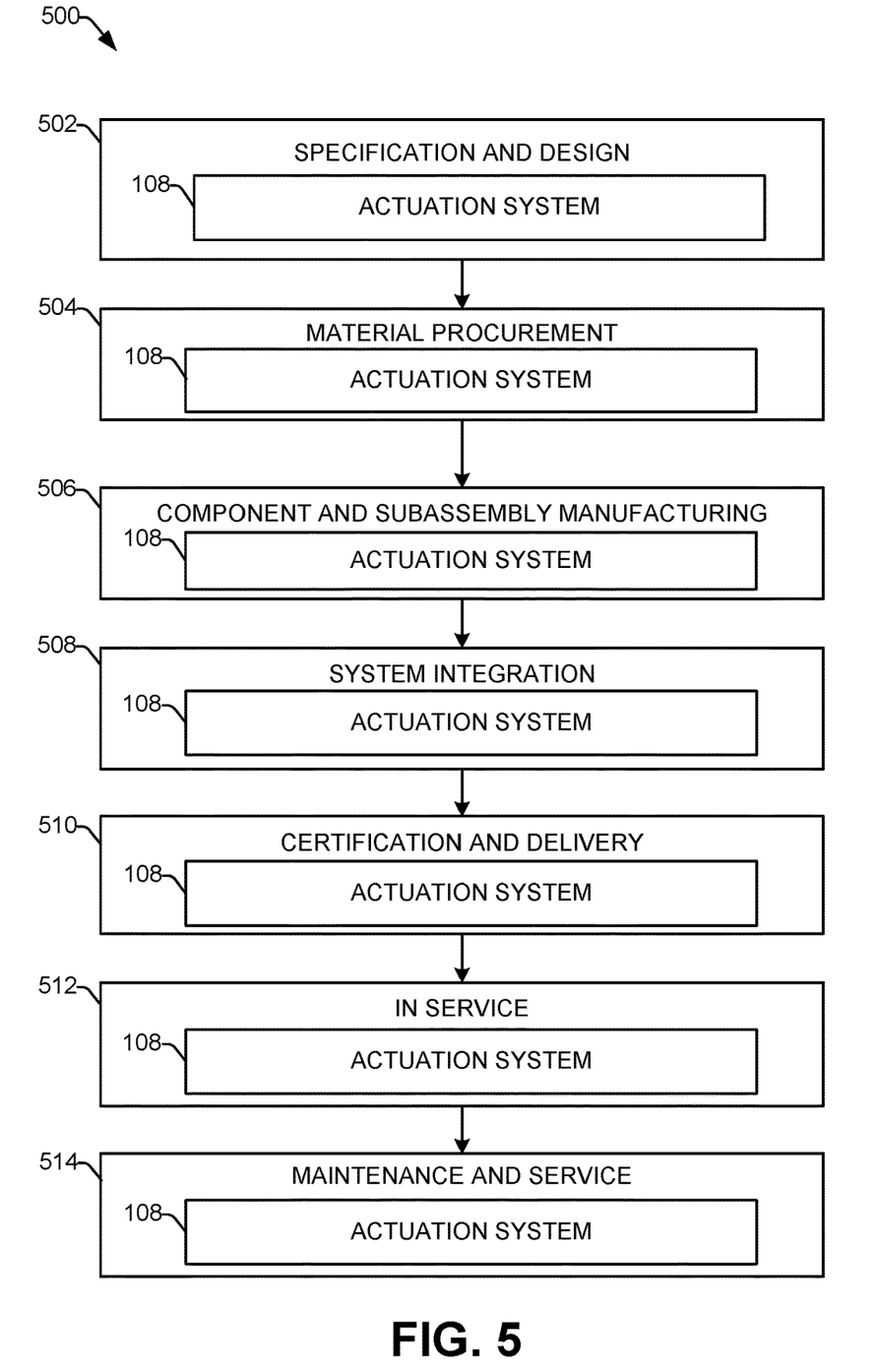
FIG. 5 is flow chart that illustrates a life cycle of an aircraft that includes the actuation system of FIG. 1A.

Referring to FIG. 5, a flowchart illustrative of a life cycle of an aircraft that includes the actuation system 108 is shown and designated 500. During pre-production, the exemplary life cycle 500 includes, at 502, specification and design of an aircraft, such as the aircraft 100 described with reference to FIG. 6. During specification and design of the aircraft, the life cycle 500 may include specification and design of the actuation system 108. At 504, the life cycle 500 includes material procurement, which may include procuring materials for the actuation system 108.

During production, the life cycle 500 includes, at 506, component and subassembly manufacturing and, at 508, system integration of the aircraft 100. For example, the life cycle 500 may include component and subassembly manufacturing of the actuation system 108 and system integration of the actuation system 108. At 510, the life cycle 500 includes certification and delivery of the aircraft 100 and, at 512, placing the aircraft 100 in service. Certification and delivery may include certification of the actuation system 108 to place the actuation system 108 in service. While in service by a customer, the aircraft 100 may be scheduled for routine maintenance and service (which may also include modification, reconfiguration, refurbishment, and so on). At 514, the life cycle 500 includes performing maintenance and service on the aircraft 100, which may include performing maintenance and service on the actuation system 108.

Each of the processes of the life cycle 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 100 as shown in FIG. 6.

Figure 6:
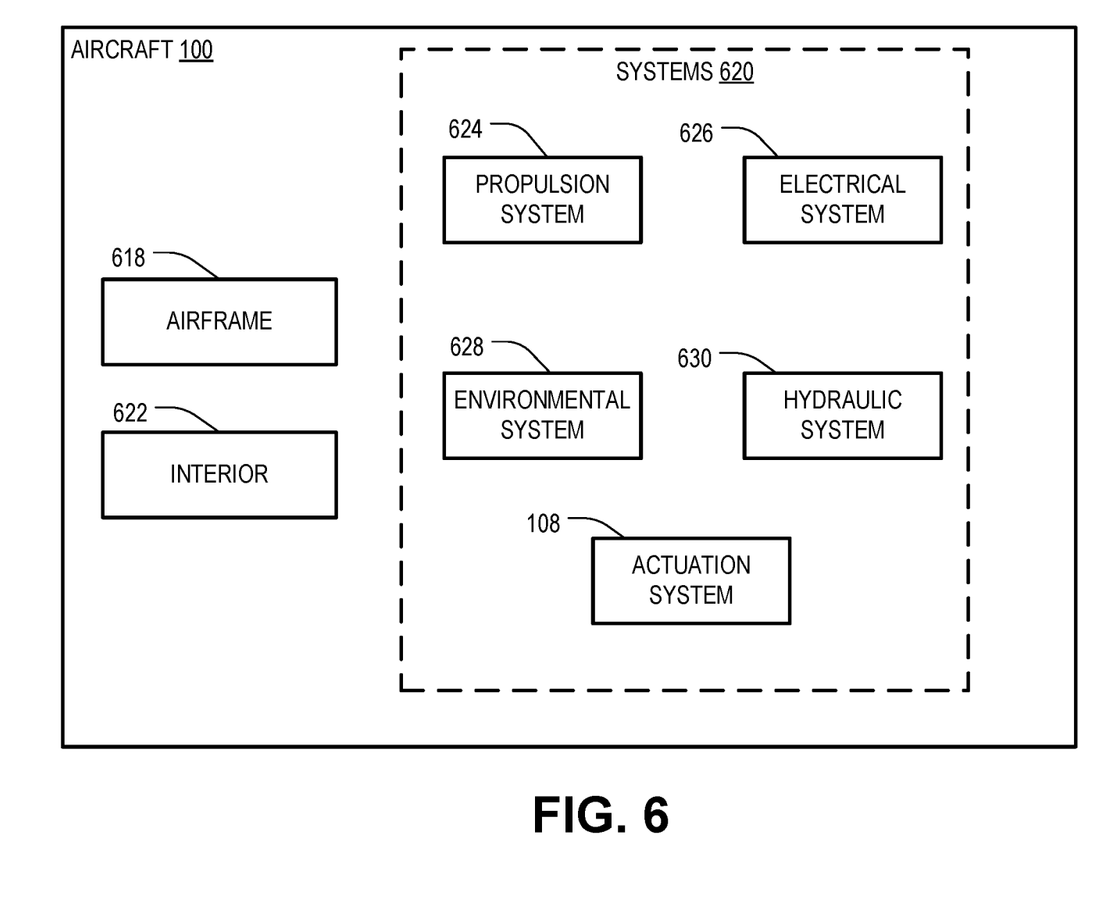
FIG. 6 is a block diagram that illustrates an aircraft including an actuation system according to a particular implementation.

In the example of FIG. 6, the aircraft 100 includes an airframe 618 with a plurality of systems 620 and an interior 622. Examples of the plurality of systems 620 include one or more of a propulsion system 624, an electrical system 626, an environmental system 628, a hydraulic system 630, and the actuation system 108. Any number of other systems may be included.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An actuation system for a control surface of an aircraft, the actuation system comprising:
   a drive lever comprising:
   a coupling end configured to pivotably couple to a plurality of wing attach fittings; and
   a lever end comprising:
   a first actuator fitting configured to pivotably couple to a first actuator on a forward side of the drive lever;
   a second actuator fitting configured to pivotably couple to a second actuator on an aft side of the drive lever;
   a first drive link fitting configured to couple, via a first drive link, to the control surface of the aircraft; and
   a second drive link fitting configured to couple, via a second drive link, to the control surface of the aircraft.

2. The actuation system of claim 1, wherein the drive lever is a unitary member having a body that defines the coupling end, the lever end, the first actuator fitting, the second actuator fitting, the first drive link fitting, and the second drive link fitting.

3. The actuation system of claim 2, wherein the body of the drive lever further defines a plurality of stiffeners extending between the coupling end and the lever end.

4. The actuation system of claim 3, wherein the plurality of stiffeners include a pair of stiffeners defining, at the coupling end, a wing pivot fitting configured to couple to a first wing attach fitting of the plurality of wing attach fittings, and defining, at the lever end, the first drive link fitting.

5. The actuation system of claim 3, wherein the plurality of stiffeners include a pair of stiffeners defining, at the coupling end, a wing pivot fitting configured to couple to a first wing attach fitting of the plurality of wing attach fittings, and defining, at the lever end, the first actuator fitting.

6. The actuation system of claim 5, wherein the pair of stiffeners further define, at the lever end, the second actuator fitting.

7. The actuation system of claim 1, wherein the coupling end includes three or more wing pivot fittings configured to rotate relative to the plurality of wing attach fittings about a wing pivot axis.

8. The actuation system of claim 7, wherein the first actuator fitting is configured to rotate relative to the first actuator about a first actuator pivot axis, the second actuator fitting is configured to rotate relative to the second actuator about a second actuator pivot axis, the first drive link fitting is configured to rotate relative to the first drive link about a first drive link pivot axis, and the second drive link fitting is configured to rotate relative to the second drive link, about a second drive link pivot axis, and wherein the first actuator pivot axis, the second actuator pivot axis, the first drive link pivot axis, the second drive link pivot axis, and the wing pivot axis are substantially parallel with one another.

9. The actuation system of claim 1, further comprising:
the first actuator on the forward side of the drive lever, the first actuator comprising:
a first end coupled to the first actuator fitting; and
a second end configured to couple, via a first actuator wing attach fitting, to a wing of the aircraft; and
the second actuator on the aft side of the drive lever, the second actuator comprising:
a first end coupled to the second actuator fitting; and
a second end configured to couple, via a second actuator wing attach fitting, to the wing of the aircraft.

10. The actuation system of claim 1, further comprising:
the first drive link comprising:
a first end coupled to the first drive link fitting; and
a second end configured to couple, via a first control surface attach fitting, to the control surface; and
the second drive link comprising:
a first end coupled to the second drive link fitting; and
a second end configured to couple, via a second control surface attach fitting, to the control surface.

11. The actuation system of claim 1, further comprising a single fairing configured to couple to a wing and to cover the first actuator, the second actuator, and the drive lever.

12. An aircraft comprising:
a control surface pivotably coupled to a static aerodynamic structure; and
an actuation system of the control surface, the actuation system comprising:
a plurality of fittings attached to the static aerodynamic structure;
a drive lever pivotably coupled, at a coupling end, to the plurality of fittings and pivotably coupled, at a lever end, to a first actuator, a second actuator, a first drive link, and a second drive link;
the first actuator coupled to the static aerodynamic structure forward of the drive lever;
the second actuator coupled to the static aerodynamic structure aft of the drive lever;
the first drive link coupled to the control surface; and
the second drive link coupled to the control surface.

13. The aircraft of claim 12, further comprising a faring coupled to the at least the static aerodynamic structure and enclosing at least the first actuator and the second actuator.

14. The aircraft of claim 12, wherein the static aerodynamic structure includes a wing and the control surface includes an aileron.

15. The aircraft of claim 12, wherein the static aerodynamic structure includes a horizontal stabilizer and the control surface includes an elevator.

16. The aircraft of claim 12, wherein the static aerodynamic structure includes a vertical stabilizer and the control surface includes a rudder.

17. The aircraft of claim 12, wherein the first actuator is configured to control a position of the control surface if the second actuator experiences a fault condition and the second actuator is configured to control the position of the control surface if the first actuator experiences a fault condition.

18. The aircraft of claim 12, wherein the control surface pivots relative to the static aerodynamic structure along a hinge line that is non-perpendicular to a major axis of aircraft, and further comprising:
a first kick lever coupled to the first drive link and coupled, via a first surface drive link, to the control surface, and
a second kick lever coupled to the second drive link and coupled, via a second surface drive link, to the control surface.

19. The aircraft of claim 18, wherein the first kick lever is coupled to the static aerodynamic structure at a first location and the second kick lever is coupled to the static aerodynamic structure at a second location, and wherein the first location is offset from the second location such that the first surface drive link has a first length that is equal to a second length of the second surface drive link.

20. A method comprising:
rotating a control surface in a first direction relative to a wing of an aircraft by applying, using a first actuator, a first force to a drive lever that is pivotably coupled, at a coupling end, to the wing and pivotably coupled, at a lever end, to the first actuator, to a second actuator, to a first drive link, and to a second drive link, wherein one or both of the first drive link and second drive link cause the control surface to rotate responsive to application of the first force to the drive lever; and
at a different time, rotating the control surface in the first direction relative to the wing of the aircraft by applying, using the second actuator, a second force to the drive lever, wherein one or both of the first drive link and second drive link cause the control surface to rotate responsive to application of the second force.

21. The method of claim 20, wherein the first actuator applies the first force by extending along a forward/aft direction and the second actuator applies the second force by retracting along the forward/aft direction.

* * * * *